FILTER ELEMENT AND METHOD OF PRODUCTION

Filed Aug. 11, 1966

Inventor:
Sydney C. Furman,
by Charles [signature] Curry
His Attorney.

United States Patent Office 3,438,504
Patented Apr. 15, 1969

3,438,504

FILTER ELEMENT AND METHOD OF PRODUCTION

Sydney C. Furman, Union City, Calif., assignor to General Electric Company, a corporation of New York Filed Aug. 11, 1966, Ser. No. 573,161
Int. Cl. B01d *39/14*
U.S. Cl. 210—483 6 Claims

ABSTRACT OF THE DISCLOSURE

A new filter and method of filter manufacture are disclosed. Typically, a dielectric tape is irradiated with fission fragments through a mask which limits the irradiated areas. The tape is then treated with an etchant which removes the tape material in the irradiated areas forming filter openings. A plurality of such openings may be continuously formed by moving the tape through the irradiation zone in synchronism with the mask.

The present invention relates generally to the charged particle irradiation art and is more particularly concerned with new filter devices and with a novel method of making them through the use of an irradiation-etching technique.

It is generally desirable that filters and similar articles have openings which are arranged in regular pattern and are of uniform size and geometry. These requirements are routinely met in the production of filters of comparatively large hole size which can be made by conventional metal or plastic forming of blanking operations. In accordance with the art prior to the present invention, it is not possible, however, to produce very small hole-size filters having such regularity of pattern, hole size and hole geometry because of the manner in which the holes are formed. Thus, heretofore the production in thin sheet material of holes or openings of diameter or cross-sectional dimensions less than 20 to 30 microns has involved chemical techniques which are not susceptible to precise control and lead to random distribution of holes and to variation in hole size and geometry. In the upper portion of this hole-size range, electric discharge or spark techniques can be used but, again, adequate control is lacking and the products do not have the desired uniformity of structure and function.

The present invention avoids these limitations and restrictions upon the production of filters of fine size and thus affords a wide selection of filter products and enables consistent reproduction of selected hole patterns, sizes and geometries. These results, moreover, are obtained through this invention without any significant increase either in the complexity of the manufacturing process or in the cost of the ultimate product.

In general, a filter or filter element of this invention comprises a flexible, dielectric material in sheet, strip, or tape form which has a plurality of openings or from three microns to 30 microns in transverse dimension arranged in predetermined pattern. Preferably, the tape is an organic polymeric material and the openings through it are arranged in a row extending longitudinally of the tape.

The method aspect of this invention, likewise broadly stated, comprises the steps of running a tape, sheet or strip of flexible, dielectric material lengthwise through a travel course along which at one point is an irradiation zone or station exposing only predetermined portions of the tape in the irradiation zone to fission fragment bombardment, and thereafter forming holes of predetermined size (from three microns to 100 microns or more) and pattern in the tape by selectively dissolving and removing all the tape material exposed to and bombarded by the fission fragment flux. As the tape travels through the irradiation zone, it passes over a masked roller which shields the tape from the irradiation source throughout its traverse of the zone, exposing only predetermined portions of the tape to bombardment by fission fragments. Subsequently, these irradiated portions are subjected to contact with a suitable solvent and the fission fragment damage tracks and tape material in the immediate vicinity and between these tracks are selectively dissolved and removed, leaving openings through the tape of the size, shape and pattern of the openings in the mask.

With reference to drawings accompanying and forming a part of this specification:

Figure 1:
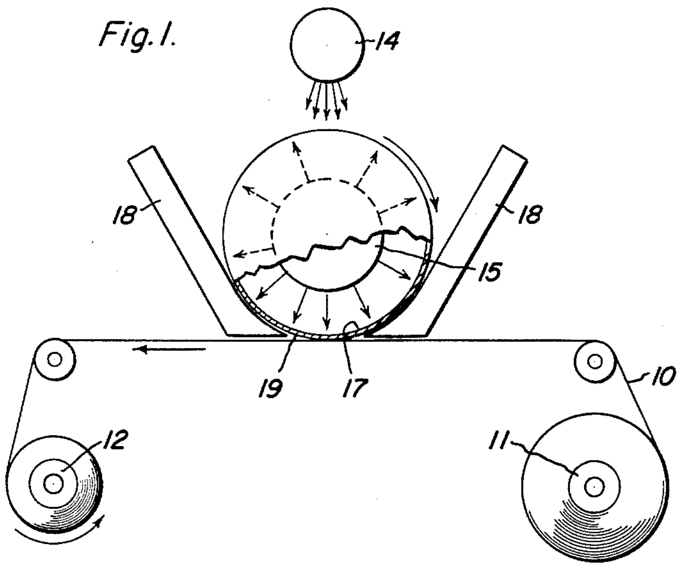
FIG. 1 is a schematic view in side elevation of apparatus for carrying out the process of this invention.

As shown in FIG. 1, a one-half mil tape 10 of flexible, dielectric material is unwound from supply reel 11 and transferred to collection reel 12 so that a length of the tape is disposed adjacent to a source of neutron radiation 14 situated above and between reels 11 and 12. A fission fragment source in the form of aluminum cylinder 15 coated on its underside with $^{235}UO_2$ is situated between tape 10 and irradiation source 14 so that fission fragments resulting from neutron bombardment of cylinder 15 will travel in the direction of the tape and penetrate the tape, forming selectively-etchable fragment damage tracks. A rotating mask 17 which is permeable to fast neutrons but impermeable to fission fragments, is provided in the form of a cylinder 15 and serves to shield tape 10 from fission fragments generated at cylinder 15 so that only limited areas in regular patterns are exposed. Mask 17 and tape 10 are synchronously driven so that there is substantially no relative motion between opposing longitudinal segments of the mask and the tape traveling through the irradiation zone. Suitable electric motor means (not shown) may be provided for this purpose or the tape may be driven manually through reel 12. A stationary radiation shield structure shown fragmentarily at 18 is disposed around cylinder 15 and mask 17 and has an opening 19 through which tape 10 is exposed to fission fragments generated at cylinder 15 and emerging into opening 19 from mask 17.

Figure 2:
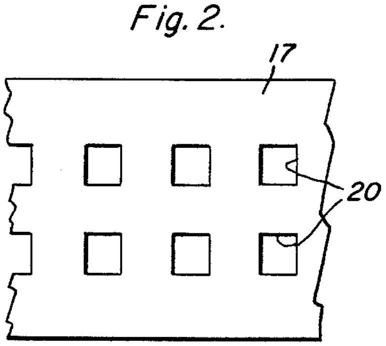
FIG. 2 is a fragmentary development view of the irradiation mask cylinder of the FIG. 1 apparatus.
Figure 3:
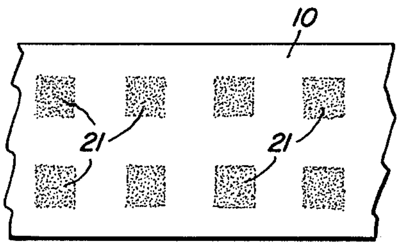
FIG. 3 is a plan view of a longituding segment of the tape following the radiation step.
Figure 4:
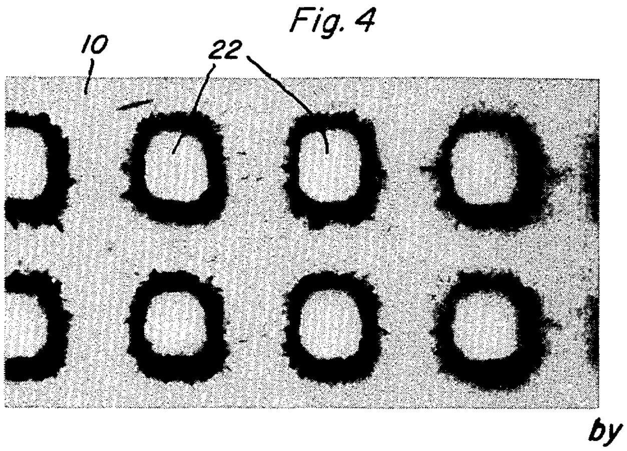
FIG. 4 is a photograph of a longitudinal segment of the FIG. 3 tape following the selective etching and removal of the portions of the tape exposed to fission fragment bombardment.

As shown in FIG. 2, a typical longitudinal segment of irradiated tape collected on reel 12 will have a dense concentration of fission fragment damage tracks in each of its portions 21 exposed through openings 20 in mask 17. Thus, when this exposed tape is "developed," i.e., subjected to contact with a suitable solvent or etchant, the damage tracks will be dissolved and removed together with immediately surrounding tape material, leaving openings as shown in FIG. 3. This step is carried out in accordance with the methods disclosed and claimed in copending applications Ser. No. 176,320, filed Feb. 28, 1962 now Patent No. 3,303,085 and Ser. No. 368,520, filed May 19,1964, both of which are assigned to the assignee hereof and the entire disclosures of both of which are incorporated herein by reference. The slightly irregular edges of openings 22 in the tape are attributable to the dissolution of portions of tape material immediately adjacent to damage track-defining material and, consequently, some slight undercutting of the masked areas of the tape.

The following illustrative, but not limiting examples of this invention as it has been carried out or as it might be carried out are offered as further disclosure of the precise details and nature of the invention.

EXAMPLE I

Using a fissionable plate and a one-half mil bisphenol acetone carbonate polymer tape one-half inch wide, a 12-inch length of tape was irradiated in a static or batch operation. The tape was exposed for 15 minutes in the irradiation zone which was two feet long. The neutron source was a nuclear reactor. The mask was a 0.001 inch thick nickel strip one inch wide and 12 inches long. The openings in the mask were 15 microns square and were arranged in a square pattern and spaced at regular intervals with 35 microns separating the open squares. The porosity of the ultimate tape filter product thus was about 36 percent and there was no overlapping or intersecting of openings or other nonuniformity, the ultimate hole size and distribution and geometry being controlled by the mask rather than the length of time of the etching operation. The holes were produced, as described above, by selectively dissolving and removing the tape material exposed through the mask to fission fragment bombardment. In this instance, 6-normal caustic soda at 80° C. was used, the irradiated tape being run through the solution so that there was a resident time of seven minutes for each segment of the tape in the solution, which was sufficient for removal of the irradiated portions of the tape but was not long enough for the unexposed portions of the tape to be substantially dissolved or eroded. A water rinse followed immediately.

EXAMPLE II

In another operation similar to that described above with reference to the drawings, long lengths of apertured tape may be produced in a sort of intermittent-continuous process. Thus, one-half mil bisphenol acetone carbonate polymer tape one-half inch wide and 1000 feet long may be exposed to fission fragments through 12-inch long opening 19 of the FIG. 1 apparatus and through the openings in that portion of the mask disposed across opening 19. The exposure period is 15 minutes so that every quarter-hour the tape is advanced one foot to bring a succeeding length of tape into position for fission fragment irradiation. Then after the entire length of the tape has been so exposed and collected on reel 12, the tape is run lengthwise through a caustic soda solution as described in Example I, being advanced intermittently again to bring three-foot lengths successively into the etching solution every seven minutes. A water rinse immediately follows to remove adhering aqueous caustic soda from the tape segments emerging from the caustic soda solution.

EXAMPLE III

In still another operation, the present invention method is carried out in apparatus as shown in FIG. 1 with the tape moving continuously at a constant rate of lengthwise travel, such that the tape is exposed for 15 minutes to fission fragment radiation through opening 19. This requires movement, i.e., rotation of mask 17 in timed relation to the tape so that the openings in the mask register with the initially exposed portions of the tape throughout the period of travel of those tape portions across opening 19. Etching or selective removal of the so irradiated portions of the tape again is accomplished by rinsing the tape through a caustic soda solution as set forth in detail in Examples I and II.

Having thus described this invention in such full, clear, concise and exact terms as to enable any person skilled in the art to which it appertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What I claim as new and desire to secure by Letters Patent of the United States is:

1. A filter element comprising a flexible dielectric bisphenol acetone carbonate polymer tape having a thickness from about 5 to about 50 microns, said tape having a plurality of substantially square openings of substantially uniform cross-sectional dimension arranged in predetermined pattern and of predetermined size between about 3 and about 30 microns across.

2. The method of making a filter element which comprises the steps of bringing a flexible dielectric tape into an irradiation zone; exposing said tape to a fission fragment flux while masking said tape to permit said fission fragments to reach only a plurality of discrete areas of said tape; and treating said tape with an etching solution which dissolves said tape in said areas which were exposed to said fission fragment flux, forming a plurality of spaced openings in said tape.

3. The method as described in claim 2 in which the tape is advanced lengthwise intermittently to bring successive segments of tape length into the irradiation zone to dwell for a predetermined exposure interval.

4. The method according to claim 2 in which the tape is advanced lengthwise continuously at a predetermined constant rate, and in which an irradiation mask is moved with successive lengths of the tape through the irradiation zone at the rate of tape travel to shield predetermined portions of each successive length of the tape from fission fragment bombardment as that length entirely traverses the irradiation zone.

5. The method of claim 2 wherein said areas are from about 3 to about 30 microns.

6. The method of claim 2 wherein said tape is of an organic polymeric material and has a thickness of from about 5 to about 50 microns.

References Cited

UNITED STATES PATENTS

| | | | |
|---|---|---|---|
| 2,267,752 | 12/1941 | Ruska et al. | 210—498 X |
| 2,345,080 | 3/1944 | Ardenne | 210—498 X |
| 3,096,204 | 7/1963 | Spangler et al. | 210—483 X |
| 3,303,085 | 2/1967 | Price et al. | 161—109 |
| 3,303,254 | 2/1967 | Simons | 210—498 |
| 3,348,022 | 10/1967 | Schirmer | 264—154 |

REUBEN FRIEDMAN, *Primary Examiner.*

JOHN ADEE, *Assistant Examiner.*

U.S. Cl. X.R.

210—500; 264—22, 41, 154